United States Patent
Ladkat et al.

(10) Patent No.: US 9,809,763 B2
(45) Date of Patent: Nov. 7, 2017

(54) PROCESS AND APPARATUS FOR RECOVERING HYDROTREATED HYDROCARBONS WITH TWO STRIPPERS

(71) Applicant: UOP LLC, Des Plaines, IL (US)

(72) Inventors: Kiran Ladkat, Gurgaon (IN); Richard K. Hoehn, Mount Prospect, IL (US); Hemant Mahajan, Gurgaon (IN)

(73) Assignee: UOP LLC, Des Plaines, IL (US)

( * ) Notice: Subject to any disclaimer, the term of this patent is extended or adjusted under 35 U.S.C. 154(b) by 211 days.

(21) Appl. No.: 14/726,956

(22) Filed: Jun. 1, 2015

(65) Prior Publication Data

US 2016/0348013 A1 Dec. 1, 2016

(51) Int. Cl.
*C10G 67/02* (2006.01)
*B01J 19/24* (2006.01)
*C10G 45/02* (2006.01)

(52) U.S. Cl.
CPC .............. *C10G 67/02* (2013.01); *B01J 19/24* (2013.01); *C10G 45/02* (2013.01); *B01J 2219/24* (2013.01); *C10G 2300/1074* (2013.01); *C10G 2400/02* (2013.01)

(58) Field of Classification Search
CPC ......... C10G 45/00; C10G 45/02; C10G 67/02
See application file for complete search history.

(56) References Cited

U.S. PATENT DOCUMENTS

| | | | |
|---|---|---|---|
| 2013/0045138 A1* | 2/2013 | Hoehn | C10G 67/00 422/187 |
| 2014/0027347 A1 | 1/2014 | Hoehn et al. | |
| 2014/0271396 A1* | 9/2014 | Van Wees | B01D 3/009 422/187 |

FOREIGN PATENT DOCUMENTS

WO WO 2013/028379 * 2/2013

* cited by examiner

*Primary Examiner* — Michelle Stein

(57) ABSTRACT

A process and apparatus is disclosed for recovering hydrotreating effluent from a hydrotreating unit utilizing a hot stripper and a cold stripper. Only the hot hydrotreating effluent is heated in a fired heater prior to product fractionation, resulting in substantial operating and capital savings. The cold stripped stream from the cold stripper bottoms line may be passed directly to a diesel pool when VGO is hydrotreated in the hydrotreating reactor bypassing the product fractionation column.

13 Claims, 1 Drawing Sheet

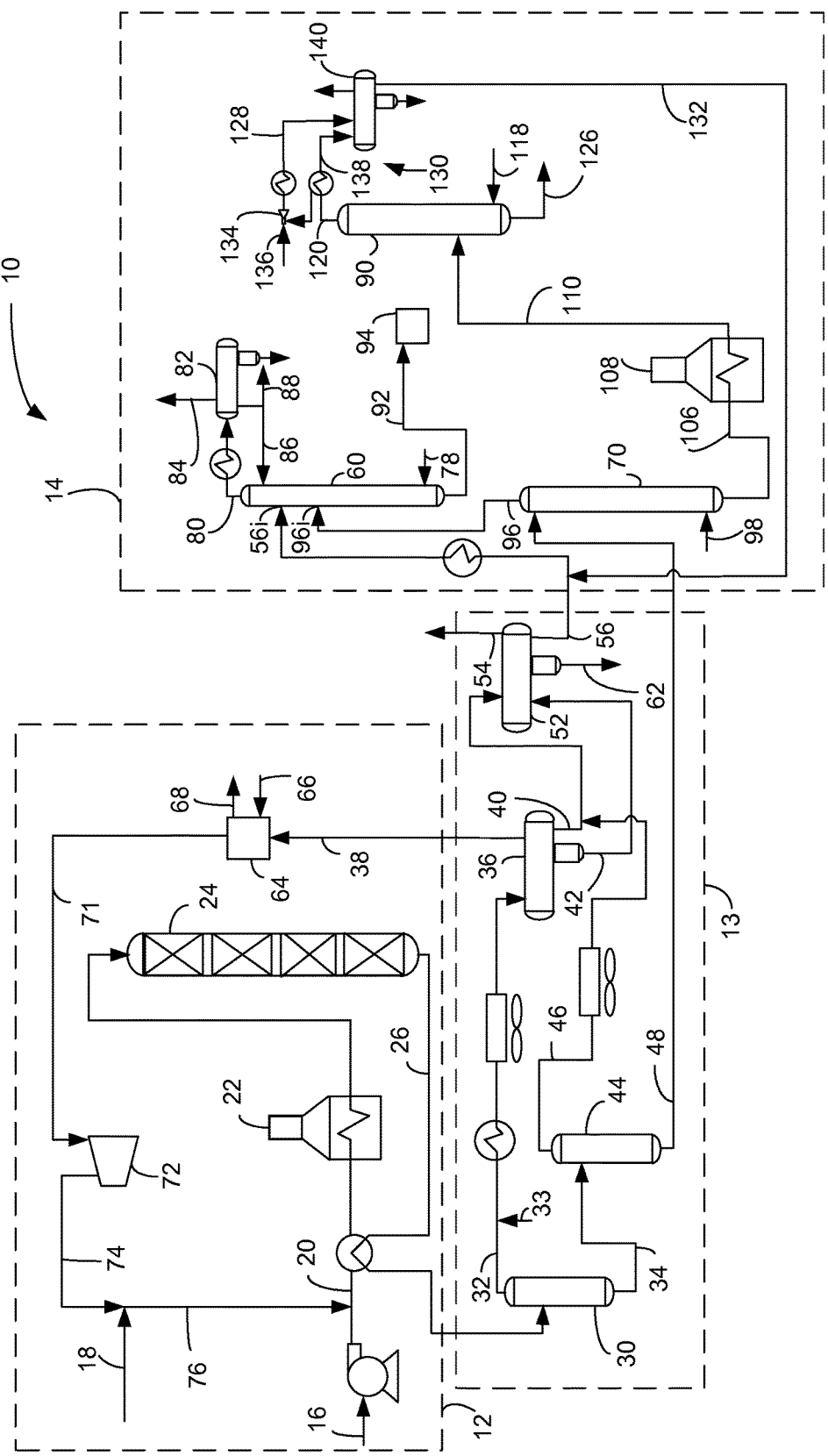

PROCESS AND APPARATUS FOR RECOVERING HYDROTREATED HYDROCARBONS WITH TWO STRIPPERS

FIELD

The technical field is the recovery of hydrotreated hydrocarbon streams.

BACKGROUND

Hydrotreating can include processes which convert hydrocarbons in the presence of hydrotreating catalyst and hydrogen to more valuable products.

Due to environmental concerns and newly enacted rules and regulations, saleable fuels must meet lower and lower limits on contaminates, such as sulfur and nitrogen. New regulations require essentially complete removal of sulfur from diesel. For example, the low sulfur diesel requirement is typically less than about 100 or 50 wppm sulfur. The ultra low sulfur diesel (ULSD) requirement is typically less than about 10 wppm sulfur.

Hydrotreating can be used to remove heteroatoms such as sulfur and nitrogen from hydrocarbon streams to meet fuel specifications and to saturate olefinic compounds. Hydrotreating can be performed at high or low pressures, but is typically operated at lower pressure than hydrocracking.

Hydrotreating recovery units typically include a single stripper for stripping hydrotreated effluent with a stripping medium such as steam to remove unwanted hydrogen sulfide. The stripped effluent then is heated in a fired heater to fractionation temperature before entering a product fractionation column to recover products such as naphtha, kerosene and diesel.

Hydrotreating is very energy-intensive due to the severe process conditions such as the high temperature and pressure used. When hydrotreating vacuum gas oil (VGO), significant amount of fuel is consumed in the feed heater to the product fractionator to separate a diesel product stream from a treated VGO product stream. For a typical VGO hydrotreating unit, the feed heater to the product fractionator may be responsible for about 42% of total utility cost.

There is a continuing need, therefore, for improved methods of recovering fuel products from hydrotreated effluents. Such methods must be more energy efficient to meet the increasing needs of refiners.

BRIEF SUMMARY

In a process embodiment, a hydrotreating process comprises hydrotreating a hydrocarbon feed stream in a hydrotreating reactor to provide hydrotreating effluent stream. The hydrotreating effluent stream is separated into a cold separator stream and a hot separator stream. The cold separator stream is stripped in a cold stripper column to provide a cold stripped stream, and the hot separator stream is stripped in a hot stripper column to provide a hot stripped stream. The hot stripped stream is fractionated in a product fractionation column, while the cold stripped stream is bypassed around the product fractionation column.

In an apparatus embodiment, an apparatus for hydrotreating comprises a hydrotreating reactor and a separation section in communication with the hydrotreating reactor. A cold stripper column and a hot stripper column are in communication with the separation section. A product fractionation column is in communication with the hot stripper column via a hot stripped line; and a cold stripped line from a bottom of the cold stripper column bypasses the product fractionation column.

In an aspect a diesel product stream may be recovered as the cold stripped stream from a bottoms line from the cold stripper column. The diesel product stream may be fed to the diesel pool without further treatment or upgrading.

BRIEF DESCRIPTION OF THE DRAWING

The FIGURE is a simplified process flow diagram of an embodiment of the present invention.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "conversion" means conversion of feed to material that boils at or below the diesel boiling range. The diesel cut point of the diesel boiling range is between about 343° and about 399° C. (650° to 750° F.) using the True Boiling Point distillation method.

As used herein, the term "diesel boiling range" means hydrocarbons boiling in the range of between about 132° and about 399° C. (270° to 750° F.) using the True Boiling Point distillation method.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

DETAILED DESCRIPTION

Two strippers may be used in a VGO hydrotreating process and apparatus 10. A hot stripper may be used for processing a hot hydrotreated separator stream which may be liquid from the hot flash drum and/or a hot separator. A cold stripper may be used for processing a cold hydrotreated separator stream which may be liquid from the cold flash drum and/or a cold separator. The cold stripper bottoms does not pass through the product fractionation feed heater but passes perhaps directly to a diesel pool without further processing. The hot stripper bottoms may pass to the product fractionation feed heater. In this design, the feed rate to the heater is reduced significantly and thus the product fractionation heater duty and size is reduced accordingly.

The apparatus and process 10 for hydrotreating hydrocarbons comprise a hydrotreating unit 12, a separation section 13 and a fractionation section 14. A hydrocarbon feed stream in hydrocarbon feed line 16 and a make-up hydrogen stream in a hydrogen make-up line 18 are fed to the hydrotreating unit 12. A hydrotreating effluent stream is separated in the separation section 13. The separation section 13 is in downstream communication with the hydrotreating reactor 24, and the fractionation section 14 is in downstream communication with the separation section 13.

A hydrogen stream in hydrogen line 76 supplemented by a make-up hydrogen stream from line 18 may join the hydrocarbon feed stream in feed line 16 to provide a hydrotreating feed stream in feed line 20. The hydrotreating feed stream in line 20 may be heated by heat exchange and in a fired heater 22 and fed to the hydrotreating reactor 24.

In one aspect, the process and apparatus 10 described herein are particularly useful for hydrotreating a conventional hydrocarbon feed stream. The most common of such conventional hydrocarbon feed streams is a "vacuum gas oil" (VGO), which is typically a hydrocarbon material having a boiling range with an IBP of at least about 232° C. (450° F.), a T5 of at least about 288° C. (550° F.) to about 343° C. (650° F.), a T95 between about 510° C. (950° F.) and about 570° C. (1058° F.) and an EP of no more than about 626° C. (1158° F.) prepared by vacuum fractionation of atmospheric residue. Such a fraction is generally low in coke precursors and heavy metal contamination. Atmospheric residue is an alternative feedstock boiling with an IBP of at least about 315° C. (600° F.), a T5 between about 340° C. (644° F.) and about 360° C. (680° F.) and a T95 of between about 700° C. (1292° F.) and about 900° C. (1652° F.) obtained from the bottoms of an atmospheric crude distillation column. Atmospheric residue is generally high in coke precursors and metal contamination relative to VGO. Other heavy hydrocarbon feedstocks which may serve as fresh hydrocarbon streams include heavy bottoms from crude oil, heavy bitumen crude oil, shale oil, tar sand extract, deasphalted residue, products from coal liquefaction and vacuum reduced crudes. Fresh hydrocarbon feedstocks also include mixtures of the above hydrocarbons and the foregoing list is not comprehensive. VGO is a preferred hydrocarbon feed stream.

Hydrotreating is performed in the hydrotreating reactor 24. Hydrotreating is a process wherein hydrogen is contacted with hydrocarbon in the presence of suitable catalysts which are primarily active for the removal of heteroatoms, such as sulfur, nitrogen and metals from the hydrocarbon feedstock. In hydrotreating, hydrocarbons with double and triple bonds may be saturated. Aromatics may also be saturated. Some hydrotreating processes are specifically designed to saturate aromatics. The cloud point of the hydrotreated product may also be reduced.

The hydrotreating reactor 24 may be a fixed bed reactor that comprises one or more vessels, single or multiple beds of catalyst in each vessel, and various combinations of hydrotreating catalyst in one or more vessels. It is contemplated that the hydrotreating reactor 24 be operated in a continuous liquid phase in which the volume of the liquid hydrocarbon feed is greater than the volume of the hydrogen gas. The hydrotreating reactor 24 may also be operated in a conventional continuous gas phase, a moving bed or a fluidized bed hydrotreating reactor.

The hydrotreating reactor 24 may comprise more than one vessel and multiple beds of hydrotreating catalyst. The hydrotreating reactor 24 may also contain hydrotreating catalyst that is suited for saturating aromatics, hydrodewaxing and hydroisomerization. Quench material such as hydrogen, hydrocarbon feed or even hydrotreated product may be injected between hydrotreating catalyst beds to cool reacted product and control reactor temperature.

Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same hydrotreating reactor 24. The Group VIII metal is typically present in an amount ranging from about 2 to about 20 wt-%, preferably from about 4 to about 12 wt-%. The Group VI metal will typically be present in an amount ranging from about 1 to about 25 wt-%, preferably from about 2 to about 25 wt-%.

Preferred hydrotreating reaction conditions include a temperature from about 290° C. (550° F.) to about 455° C. (850° F.), suitably 316° C. (600° F.) to about 427° C. (800° F.) and preferably 343° C. (650° F.) to about 399° C. (750° F.), a pressure from about 2.1 MPa (gauge) (300 psig), preferably 4.1 MPa (gauge) (600 psig) to about 20.6 MPa (gauge) (3000 psig), suitably 12.4 MPa (gauge) (1800 psig), preferably 6.9 MPa (gauge) (1000 psig), a liquid hourly space velocity of the fresh hydrocarbonaceous feedstock from about 0.1 $hr^{-1}$, suitably 0.5 $hr^{-1}$, to about 4 $hr^{-1}$, preferably from about 1.5 to about 3.5 $hr^{-1}$, and a hydrogen rate of about 168 $Nm^3/m^3$ (1,000 scf/bbl), to about 1,011 $Nm^3/m^3$ oil (6,000 scf/bbl), preferably about 168 $Nm^3/m^3$ oil (1,000 scf/bbl) to about 674 Nm³/m³ oil (4,000 scf/bbl), with a hydrotreating catalyst or a combination of hydrotreating catalysts.

A hydrotreating effluent exits the hydrotreating reactor 24 and is transported in hydrotreating effluent line 26 to the separation section 13. The hydrotreating effluent in hydrotreating effluent line 26 may in an aspect be heat exchanged with the hydrotreating feed stream in line 20 to be cooled before entering the separation section 13. The hydrotreating effluent comprises material that is separated to become a cold separator stream and a hot separator stream in the separation section 13. The separation section 13 may comprise one or more separators for separating the hydrotreating effluent stream into a cold separator stream and hot separator stream.

In the separation section 13, the cooled hydrotreating effluent enters a hot separator 30. The hot separator separates the hydrotreating effluent to provide a vaporous hydrocarbonaceous hot separator stream in a hot separator overhead line 32 and a liquid hydrocarbonaceous hot separator stream in a hot separator bottoms line 34. The hot separator 30 in the separation section 13 is in downstream communication with the hydrotreating reactor 24. The hot separator 30 operates at about 150° C. (300° F.) to about 371° C. (700° F.) and preferably operates at about 177° C. (350° F.) to about 315° C. (600° F.). The hot separator 30 may be operated at a slightly lower pressure than the hydrotreating reactor 24 accounting for pressure drop of intervening equipment. The hot separator may be operated at pressures between about 3.4 MPa (gauge) (493 psig) and about 20.4 MPa (gauge) (2959 psig).

The vaporous hydrocarbonaceous hot separator overhead stream in the overhead line 32 may be cooled before entering a cold separator 36. As a consequence of the reactions taking place in the hydrotreating reactor 24 wherein nitrogen, chlorine and sulfur are removed from the feed, ammonia and hydrogen sulfide are formed. At a characteristic temperature, ammonia and hydrogen sulfide will combine to form ammonium bisulfide and ammonia and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the line 32 transporting the hot separator overhead stream, a suitable amount of wash water in line 33 may be introduced into line 32 at a point upstream of the heat exchange equipment in line 32 where the temperature is above the characteristic sublimation temperature of either compound.

The cold separator 36 serves to separate hydrogen from hydrocarbon in the hydrotreating effluent for recycle to the hydrotreating reactor 24 in the overhead line 38. The vaporous hydrocarbonaceous hot separator overhead stream may be separated in the cold separator 36 to provide a vaporous cold separator overhead stream comprising a hydrogen-rich gas stream in an overhead line 38 and a liquid cold separator stream in a cold separator bottoms line 40. The cold separator 36, therefore, is in downstream communication with the overhead line 32 of the hot separator 30 and the hydrotreating reactor 24. The cold separator 36 may be operated at about 100° F. (38° C.) to about 150° F. (66° C.), suitably about 115° F. (46° C.) to about 145° F. (63° C.), and just below the pressure of the hydrotreating reactor 24 and the hot separator 30 accounting for pressure drop of intervening equipment to keep hydrogen and light gases in the overhead and normally liquid hydrocarbons in the bottoms. The cold separator may be operated at pressures between about 1.6 MPa (gauge) (232 psig) and about 20 MPa (gauge) (2,901 psig). The cold separator 36 may also have a boot for collecting an aqueous phase in line 42. The cold separator 36 is operated at a lower temperature than the hot separator 30, and the liquid cold separator stream in cold separator bottoms line 40 is at a lower temperature than the liquid hot separator stream in the hot separator bottoms line 34.

The liquid hot separator stream in the hot separator bottoms line 34 is hotter than the liquid cold separator stream in the cold separator bottoms line 40. The liquid hot separator stream in the hot separator bottoms line 34 may be fractionated as a hot separator stream in the fractionation section 14. In an aspect, the liquid hot separator stream in the bottoms line 34 may be let down in pressure and flashed in a hot flash drum 44 to provide a hot flash overhead stream of light ends in an overhead line 46 and a flashed hot separator stream in a hot flash bottoms line 48. The hot flash drum 44 may be any separator that splits the liquid hydrotreating effluent into vapor and liquid fractions. The hot flash drum 44 may be operated at the same temperature as the hot separator 30 but at a lower pressure of between about 2.1 MPa (gauge) (300 psig) and about 6.9 MPa (gauge) (1000 psig), suitably less than about 3.4 MPa (gauge) (500 psig). The flashed hot separator stream in the hot flash bottoms line 48 may be further fractionated in the fractionation section 14. In an aspect, the flashed hot separator stream in the hot flash bottoms line 48 may be introduced into a hot stripper 70 and comprise at least a portion, and suitably all, of a hot separator stream that is of a greater temperature than the cold separator stream in cold separator bottoms line 40. The hot stripper column 70 is in downstream communication with a bottom of the hot flash drum 44 via the hot flash bottoms line 48 and the hot separator 30 via the hot separator bottoms line 34.

In an aspect, the liquid cold separator stream in the cold separator bottoms line 40 may be fractionated as a cold separator stream in the fractionation section 14. In a further aspect, the liquid cold separator bottoms stream may be let down in pressure and flashed in a cold flash drum 52 to separate the liquid cold separator stream in the cold separator bottoms line 40. The cold flash drum 52 may be any separator that splits the liquid cold separator stream into vapor and liquid fractions. The cold flash drum 52 may be in communication with a bottom of the cold separator 36 via the cold separator bottoms line 40. A cold stripper column 60 may be in downstream communication with the separation section 13 and, particularly, the cold flash bottoms line 56 of the cold flash drum 52.

In a further aspect, the vaporous hot flash overhead stream in the hot flash overhead line 46 may be fractionated as a cold separator stream in the fractionation section 14. In a further aspect, the hot flash overhead stream may be cooled and also separated in the cold flash drum 52. The cold flash drum 52 may separate the cold separator stream in cold separator bottoms line 40 and hot flash overhead stream in hot flash overhead line 46 to provide a vaporous cold flash stream in cold flash overhead line 54 and a flashed cold separator stream in a cold flash bottoms line 56 comprising at least a portion of a hydrotreated effluent stream. In an aspect, the cold stripper 60 is in downstream communication with the cold flash drum 52 via the cold flash bottoms line 56. The cold flash drum 52 may be in downstream communication with the cold separator bottoms line 40 of the cold separator 36, the overhead line 46 of the hot flash drum 44 and the hydrotreating reactor 24. The cold separator stream in the cold separator bottoms line 40 and the hot flash overhead stream in hot flash overhead line 46 may enter into the cold flash drum 52 either together or separately. In an aspect, the hot flash overhead line 46 joins the cold separator bottoms line 40, perhaps after cooling, and feeds the vaporous hot flash stream and the liquid cold separator stream together to the cold flash drum 52. The cold flash drum 52 may be operated at the same temperature as the cold separator 36 but typically at a lower pressure of between about 1.7 MPa (gauge) (250 psig) and about 7.0 MPa (gauge) (1000 psig) and preferably no higher than 3.1 MPa (gauge) (450 psig). The cold flash drum 52 operates at a lower temperature than the hot flash drum 44 and the hot separator 30. The flashed cold separator stream in cold flash bottoms line 56 is at a lower temperature than the hot separator stream in hot separator bottoms line 34 and the flashed hot separator stream in the hot flash bottoms line 48. The aqueous stream in line 42 from the boot of the cold separator may also be directed to the cold flash drum 52. A flashed aqueous stream is removed from a boot in the cold flash drum 52 in line 62.

The vaporous cold separator stream comprising hydrogen in the cold separator overhead line 38 is rich in hydrogen. The vaporous cold separator stream in the cold separator overhead line 38 may be passed through a frayed or packed scrubbing tower 64 where it is scrubbed with a scrubbing liquid such as an aqueous amine solution in line 66 to remove hydrogen sulfide and ammonia. The spent scrubbing liquid exiting the scrubbing tower 64 in line 68 may be regenerated and recycled back to the scrubbing tower 64. The scrubbed hydrogen-rich stream emerges from the scrubber via line 71 and may be compressed in a recycle compressor 72 to provide a recycle hydrogen stream in line 74 which is a compressed vaporous hydrotreating effluent stream. The recycle compressor 72 may be in downstream communication with the hydrotreating reactor 24. The recycle hydrogen stream in line 74 may be supplemented with make-up hydrogen stream 18 to provide the hydrogen stream in hydrogen line 76. A portion of the material in line 74 may be routed to the intermediate catalyst bed outlets in the hydrotreating reactor 24 to quench and control the inlet temperature of the subsequent catalyst bed (not shown).

The fractionation section 14 may include a cold stripper column 60, a hot stripper column 70 and a product fractionation column 90. The cold stripper column 60 is in downstream communication with the hydrotreating reactor 24 and the separation section 13 for stripping the cold separator stream which is a portion of the hydrotreating effluent stream in hydrotreating effluent line 26, and the hot stripper column 70 is in downstream communication with the hydrotreating reactor 24 and the separation section 13 for stripping the hot separator stream which is also a portion of the hydrotreating effluent stream in hydrotreating effluent line 26. In an aspect, the cold separator stream is the flashed cold separator stream in the cold flash bottoms line 56 and the hot separator stream is the flashed hot separator stream in the hot flash bottoms line 48, but other sources of these streams are contemplated. For example, the cold separator stream could be cold separator stream in the cold separator bottoms line 40 and the hot separator stream could be the hot separator stream in the hot separator bottoms line 34.

The cold separator stream which in an aspect may be in the cold flash bottoms line 56 or the cold separator bottoms line 40 may be heated and fed to the cold stripper column 60 near a top of the column through an inlet 56*i*. In an aspect, a condensed net overhead stream in a net overhead line 132 from the product fractionation column 90 may enter the cold stripper column 60 separately from or after mixing with the flashed cold separator stream in the cold flash bottoms line 56. In an aspect, the cold stripper column 60 may be in downstream communication with the net overhead line 132 of the product fractionation column 90. The cold separator stream may be stripped in the cold stripper column 60 with a cold stripping media which is an inert gas such as steam from a cold stripping media line 78 to provide a cold vapor stream of naphtha, hydrogen, hydrogen sulfide, steam and other gases in an overhead line 80. At least a portion of the cold vapor stream may be condensed and separated in a receiver 82. An overhead line 84 from the receiver 82 carries vaporous off gas for further treating. An unstabilized liquid naphtha stream from the bottoms of the receiver 82 may be split between a reflux portion in line 86 refluxed to the top of the cold stripper column 60 and a product portion which may be transported in product line 88 to further fractionation such as in a debutanizer or a deethanizer column (not shown). The cold stripper column 60 may be operated with a bottoms temperature between about 149° C. (300° F.) and about 260° C. (500° F.) and an overhead pressure of about 0.5 MPa (gauge) (73 psig) to about 2.0 MPa (gauge) (290 psig). The temperature in the overhead receiver 82 ranges from about 38° C. (100° F.) to about 66° C. (150° F.) and the pressure is essentially the same as in the overhead of the cold stripper column 60.

A hydrotreated cold stripped stream in a cold stripped line 92 from a bottom of the cold stripper column may bypass around the product fractionation column 90. In an aspect, when the hydrocarbon feed stream in line 16 comprises a VGO stream, the cold stripped stream that has been hydrotreated provides a low sulfur diesel or ultra low sulfur diesel stream that may be passed, in an aspect directly, to a diesel pool 94 or a diesel transfer line in upstream communication with a diesel pool. The cold stripped stream may have a T90 of between about 220° C. (428° F.) and about 370° C. (698° F.) and preferably between about 350° C. (662° F.) and about 365° C. (689° F.) and a T5 of between about 150° C. (302° F.) and about 195° C. (383° F.) and preferably between about 180° C. (356° F.) and about 190° C. (374° F.). Accordingly, the diesel pool 94 may be in downstream communication with the cold stripped line 92. Moreover, the product fractionation column 90 may be out of downstream communication with the bottoms line 92 of the cold stripper column 60. In an aspect, the cold stripper column 60 may be in downstream communication with the product fractionation column 90.

The hot separator stream which may be in the hot flash bottoms line 48 or the hot separator bottoms line 34 may be fed to the hot stripper column 70 near a top thereof. The hot separator stream in hot flash bottoms line 48 is of a higher temperature than the cold separator stream in the cold flash bottoms line 56 before and typically after the cold separator stream is heated. The hot separator stream which comprises at least a portion of the liquid hydrotreating effluent may be stripped in the hot stripper column 70 with a hot stripping media which is an inert gas such as steam from line 98 to provide a hot stripper overhead stream of diesel, naphtha, hydrogen, hydrogen sulfide, steam and other gases in an overhead line 96. Instead of condensing and separating a portion of the hot stripper overhead stream in a receiver, the hot stripper overhead stream in the overhead line 96 may be passed directly to the cold stripper column 60 through an inlet 96*i*. Accordingly, the hot stripper column 70 can omit typical overhead equipment, such as a condenser and a receiver along with the necessary piping and rely on the cold stripper column for these functions. The hot stripper overhead stream may enter the cold stripper column 60 at the inlet 96*i* with an elevation below an elevation of the inlet 56*i* for the cold separator stream in the cold flash bottoms line 56. In the cold stripper column 60, the hot stripper overhead stream from the hot stripper column 70 is further stripped to provide a cold stripped stream in bottoms line 92 comprising product diesel. The hot stripper column 70 may be operated with a bottoms temperature between about 160° C. (320° F.) and about 360° C. (680° F.) and an overhead pressure of about 0.5 MPa (gauge) (73 psig) to about 2.0 MPa (gauge) (292 psig).

A hydrotreated, hot stripped stream is produced in a hot stripped line 106. At least a portion of the hot stripped stream in hot stripped line 106 may be fed to the product fractionation column 90. Consequently, the product fractionation column 90 is in downstream communication with the hot stripper column 70 via the hot stripped line 106 of the hot stripper. In an aspect, the entire hot stripped stream in the hot stripped line 106 is passed to the product fractionation column 90 and is fractionated therein. In a further aspect, the hot stripped stream is passed directly to the product fractionation column 90. Hence, the product fractionation column may be in direct, downstream communication with the hot stripped line 106 of the hot stripper 70.

A fired heater 108 in downstream communication with the hot stripped line 106 may heat at least a portion of the hot stripped stream before it enters the product fractionation column 90 in line 110. In an unshown aspect, the hot stripped stream in hot bottoms line 106 may be separated in a prefractionation separator before entering the fired heater 108. A vaporous hot stripped stream in an overhead line from the prefractionation separator may be passed into the product fractionation column 90 after bypassing the fired heater 108 at an inlet above an inlet for a liquid, heated hot stripped stream in bottoms line from the prefractionation separator.

The product fractionation column 90 may be in downstream communication with the hot stripper column 70 for fractionating the heated, hot stripped stream in line 110 into product streams. The product fractionation column 90 may utilize inert stripping media such as steam from line 118 to provide further heat input to the column. The product streams may include a net overhead stream in a net overhead line 132 which may be recycled back to the cold flash stripper 60, and a low sulfur VGO stream in a bottoms line 126 suitable for further processing, such as in an FCC unit or a hydrocracking unit.

In an aspect, the product fractionation column 90 may be operated as a vacuum column, which operates below atmospheric pressure. As such, the overhead stream in an overhead line 120 may be pulled from the product fractionation column 90 through a vacuum system 130. The vacuum system may include an eductor 134 for generating a vacuum when an inert gas stream such as steam in line 136 is fed through the eductor. The eductor pulls vapor material from the condenser on line 120 generating a vacuum in the product fractionation column 90. Condensers feed condensed materials in lines 128 and 138 into the receiver 140. The hydrocarbon liquid stream from the receiver 140 provides the net overhead stream that is recycled to the cold flash stripper 60. The product fractionation column 90 is maintained at a pressure between about 1.3 kPa(a) (10 torr(a)) and 67 kPa(a) (500 torr(a)), preferably between about 13 (100 torr(a)) and 40 kPa(a) (300 torr(a)) and at a vacuum distillation temperature of about 300° C. (572° F.) to about 400° C. (752° F.) resulting in an atmospheric equivalent cut point between diesel and VGO of between about 316° C. (600° F.) and about 427° C. (800° F.).

Sour water streams may be collected from boots of overhead receivers 82 and 140.

The cold stripped stream in the cold stripped bottoms line 92 is recovered directly as a diesel blending stock without further fractionation or upgrading by chemical conversion. In this process and apparatus, the product fractionation column 90 does not need to re-separate the cold stripped bottoms stream in the cold stripped line 92 such as at vacuum pressure. As a consequence, the heater duty in fired heater 108 for the product fractionation column 90 is reduced significantly because only the hot stripped stream in line 106 is fed to the product fractionation column 90 and the fired heater 108. Therefore, the size of the product fractionation column 90 and the fired heater 108 and the cost to operate them are both reduced at the same time.

SPECIFIC EMBODIMENTS

While the following is described in conjunction with specific embodiments, it will be understood that this description is intended to illustrate and not limit the scope of the preceding description and the appended claims.

A first embodiment of the invention is a process comprising hydrotreating a hydrocarbon feed stream in a hydrotreating reactor to provide hydrotreating effluent stream; separating the hydrotreating effluent stream into a cold separator stream and a hot separator stream. stripping the cold separator stream in a cold stripper column to provide a cold stripped stream; stripping the hot separator stream in a hot stripper column to provide a hot stripped stream; fractionating the hot stripped stream in a product fractionation column; and bypassing the cold stripped stream around the product fractionation column. An embodiment of the invention is one, any or all of prior embodiments in this paragraph up through the first embodiment in this paragraph further comprising passing the cold stripped stream to a diesel pool. An embodiment of the invention is one, any or all of prior embodiments in this paragraph up through the first embodiment in this paragraph wherein the hydrotreating reactor is a hydrotreating reactor containing a hydrotreating catalyst. An embodiment of the invention is one, any or all of prior embodiments in this paragraph up through the first embodiment in this paragraph further comprising operating the product fractionation column at below atmospheric pressure. An embodiment of the invention is one, any or all of prior embodiments in this paragraph up through the first embodiment in this paragraph further comprising transporting an entirety of the hot stripped stream directly to the product fractionation column. An embodiment of the invention is one, any or all of prior embodiments in this paragraph up through the first embodiment in this paragraph further comprising recycling a condensed overhead stream from the product fractionation column to the cold stripper column. An embodiment of the invention is one, any or all of prior embodiments in this paragraph up through the first embodiment in this paragraph wherein the hydrocarbon feed stream is a VGO stream. An embodiment of the invention is one, any or all of prior embodiments in this paragraph up through the first embodiment in this paragraph further comprising stripping an overhead stream of the hot stripper column in the cold stripper column. An embodiment of the invention is one, any or all of prior embodiments in this paragraph up through the first embodiment in this paragraph further comprising heating the hot stripped stream in a fired heater before fractionating the hot stripped stream. An embodiment of the invention is one, any or all of prior embodiments in this paragraph up through the first embodiment in this paragraph wherein the hot separator stream is of a higher temperature than the cold separator stream.

A second embodiment of the invention is a process comprising hydrotreating a hydrocarbon feed stream in a hydrotreating reactor to provide hydrotreating effluent stream; separating the hydrotreating effluent stream into a cold separator stream and a hot separator stream; stripping the cold separator stream in a cold stripper column to provide a cold stripped stream; stripping the hot separator stream in a hot stripper column to provide a hot stripped stream; fractionating the hot stripped stream in a product fractionation column; and passing the cold stripped stream around the product fractionation column to a diesel pool. An embodiment of the invention is one, any or all of prior embodiments in this paragraph up through the second embodiment in this paragraph further comprising operating the product fractionation column at below atmospheric pressure. An embodiment of the invention is one, any or all of prior embodiments in this paragraph up through the second embodiment in this paragraph further comprising transporting the hot stripped stream directly to the product fractionation column. An embodiment of the invention is one, any or all of prior embodiments in this paragraph up through the second embodiment in this paragraph further comprising transporting the cold stripped stream directly to the diesel pool. An embodiment of the invention is one, any or all of prior embodiments in this paragraph up through the second embodiment in this paragraph further comprising stripping an overhead stream of the hot stripper column in the cold stripper column.

A third embodiment of the invention is an apparatus for hydrotreating comprising a hydrotreating reactor; a separation section in communication with the hydrotreating reactor; a cold stripper column in communication with the separation section; a hot stripper column in communication with the separation section; a product fractionation column in communication with the hot stripper column via a hot stripped line; and a cold stripped line from a bottom of the cold stripper column bypassing the product fractionation column. An embodiment of the invention is one, any or all of prior embodiments in this paragraph up through the third embodiment in this paragraph further comprising a diesel pool in communication with the cold stripped line. An embodiment of the invention is one, any or all of prior embodiments in this paragraph up through the third embodiment in this paragraph wherein the product fractionation column is a vacuum column. An embodiment of the invention is one, any or all of prior embodiments in this paragraph up through the third embodiment in this paragraph wherein the hydrotreating reactor is a hydrotreating reactor. An embodiment of the invention is one, any or all of prior embodiments in this paragraph up through the third embodiment in this paragraph wherein the cold stripper column is in downstream communication with the product fractionation column.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A hydrotreating process comprising:
hydrotreating a hydrocarbon feed stream in a hydrotreating reactor to provide hydrotreating effluent stream;
separating said hydrotreating effluent stream into a cold separator stream and a hot separator stream;
stripping said cold separator stream in a cold stripper column to provide a cold stripped stream;
stripping said hot separator stream in a hot stripper column to provide a hot stripped stream;
fractionating said hot stripped stream in a product fractionation column;
bypassing said cold stripped stream around said product fractionation column; and
recycling a condensed overhead stream from said product fractionation column to said cold stripper column.

2. The hydrotreating process of claim 1 further comprising passing said cold stripped stream to a diesel pool.

3. The hydrotreating process of claim 1 wherein said hydrotreating reactor is a hydrotreating reactor containing a hydrotreating catalyst.

4. The hydrotreating process of claim 1 further comprising operating said product fractionation column at below atmospheric pressure.

5. The hydrotreating process of claim 1 further comprising transporting an entirety of said hot stripped stream directly to said product fractionation column.

6. The hydrotreating process of claim 1 wherein said hydrocarbon feed stream is a VGO stream.

7. The hydrotreating process of claim 6 further comprising stripping an overhead stream of said hot stripper column in said cold stripper column.

8. The hydrotreating process of claim 1 further comprising heating said hot stripped stream in a fired heater before fractionating said hot stripped stream.

9. The hydrotreating process of claim 1 wherein said hot separator stream is of a higher temperature than said cold separator stream.

10. A hydrotreating process comprising:
hydrotreating a hydrocarbon feed stream in a hydrotreating reactor to provide hydrotreating effluent stream;
separating said hydrotreating effluent stream into a cold separator stream and a hot separator stream;
stripping said cold separator stream in a cold stripper column to provide a cold stripped stream;
stripping said hot separator stream in a hot stripper column to provide a hot stripped stream;
fractionating said hot stripped stream in a product fractionation column operating at pressure of between about 13 kPa(a) and about 67 kPa(a); and
passing said cold stripped stream around said product fractionation column to a diesel pool.

11. The hydrotreating process of claim 10 further comprising transporting said hot stripped stream directly to said product fractionation column.

12. The hydrotreating process of claim 10 further comprising transporting said cold stripped stream directly to said diesel pool.

13. The hydrotreating process of claim 10 further comprising stripping an overhead stream of said hot stripper column in said cold stripper column.

* * * * *